United States Patent
Amano et al.

(10) Patent No.: US 6,318,654 B1
(45) Date of Patent: Nov. 20, 2001

(54) SPINNING REEL FOR FISHING

(75) Inventors: Tomoyuki Amano, Saitama; Shigeto Yamada; Toshiaki Yoshikawa, both of Tokyo; Naoki Okamoto, Saitama, all of (JP)

(73) Assignee: Daiwa Seiko, Inc., Tokyo (JP)

( * ) Notice: Subject to any disclaimer, the term of this patent is extended or adjusted under 35 U.S.C. 154(b) by 0 days.

(21) Appl. No.: 09/535,535

(22) Filed: Mar. 27, 2000

Related U.S. Application Data

(63) Continuation-in-part of application No. 09/215,269, filed on Dec. 18, 1999, now Pat. No. 6,220,537, which is a continuation-in-part of application No. 08/813,875, filed on Mar. 7, 1999, now Pat. No. 5,868,331.

(30) Foreign Application Priority Data

| Mar. 25, 1999 | (JP) | 11-081454 |
| Mar. 25, 1999 | (JP) | 11-081455 |
| Mar. 30, 1999 | (JP) | 11-089202 |

(51) Int. Cl.[7] ................................................ A01K 89/01
(52) U.S. Cl. ........................................................... 242/231
(58) Field of Search ..................... 242/230, 231, 242/232, 233, 234

(56) References Cited

U.S. PATENT DOCUMENTS

| 3,670,984 | * | 6/1972 | Lemery | 242/231 |
| 4,577,807 | * | 3/1986 | Urso | 242/230 |
| 4,874,144 | * | 10/1989 | Murakami | 242/230 |
| 5,149,006 | | 9/1992 | Hitomi . | |
| 5,261,627 | * | 11/1993 | Shinohara | 242/231 |
| 5,868,331 | * | 2/1999 | Shinohara et al. | 242/231 |

FOREIGN PATENT DOCUMENTS

| 0 793 912 A | | 9/1997 | (EP) . | |
| 1096590 | * | 6/1955 | (FR) | 242/231 |
| 3117462 | | 12/1991 | (JP) . | |
| 543865 | | 6/1993 | (JP) . | |
| 10117644 | | 5/1998 | (JP) . | |
| 7198 | * | 2/1974 | (JP) | 242/232 |

* cited by examiner

Primary Examiner—Emmanuel M. Marcelo
(74) Attorney, Agent, or Firm—Liniak, Berenato, Longacre & White

(57) ABSTRACT

A bail (20) is joined to a pair of bail joining arms (16) through a pair of bail support members such that rotation and inversion of the bail (20) are permitted. One of the bail support members incorporates a swing arm (18), a line roller (22) rotatively joined to the swing arm and a fishing-line introducing portion (24) disposed adjacent to the line roller. A bail joining portion (26) to which an end of the bail can be joined is formed at the leading end of the fishing-line introducing portion to project over the leading end. The fishing-line introducing portion has a shape (a curved surface), the diameter of which is gradually reduced from the line roller to the bail joining portion. Moreover, the end and the bail joining portion arm joined to substantially the same axis by a predetermined joining means.

26 Claims, 10 Drawing Sheets

SPINNING REEL FOR FISHING

This application is a continuation-in-part of U.S. patent application Ser. No. 09/215,269 filed Dec. 18, 1999, now U.S. Pat. No. 6,220,537, which is a continuation-in-part of U.S. patent application Ser. No. 08/813,875 filed Mar. 7, 1997; now U.S. Pat. No. 5,868,331.

BACKGROUND OF THE INVENTION

1. Field of the Invention

The present invention relates to a spinning reel for fishing which is capable of preventing entwining of a fishing line and damage caused from the fishing line.

2. Description of the Related Art

Hitherto, a bail and a bail support member for supporting the bail are joined to the arm of a rotor of a spinning reel for fishing. The bail support member incorporates a fishing-line guide portion and a fishing-line introducing portion having a bail attaching portion to which an end of the bail can be joined. The bail support member permits the bail to be rotated to the positions at which the fishing line is unreeled and reeled. The bail support member has the structure that the fishing-line introducing portion is disposed adjacent to the fishing-line guide portion. When the bail is rotated reversely, the fishing line can be guided to the fishing-line guide portion.

The foregoing structure has a stepped portion and a bent portion in the bail attaching portion between the bail and the fishing-line introducing portion according to the shape of the fishing-line introducing portion. Therefore, the fishing line picked by the bail when the bail is inverted is undesirably caught by the fishing-line introducing portion and a portion adjacent to the bail attaching portion. Thus, there arises a problem in that entwining of the fishing line occurs and damage is caused from the fishing line.

Therefore, a technique has been disclosed in, for example, Japanese Utility Model Unexamined Publication No. Hei.3-117462. According to the disclosure, the bail and the fishing-line introducing portion are formed integrally. Moreover, the fishing-line introducing portion is formed into a conical shape. Thus, any stepped portion of the bail attaching portion between the bail and the fishing-line introducing portion is not formed. Moreover, the bail attaching portion between the bail and the fishing-line introducing portion is disposed more adjacent to the reel body to prevent, for example, entwining of the fishing line (hereinafter called a "first conventional technique")

In Japanese Patent Unexamined Publication No. Hei.10-117644, a technique has been disclosed with which the fishing-line introducing portion is formed in such a manner that the distance between a region of the bail with which the fishing line is brought into contact and a region of the spool with which the fishing line is brought into contact is gradually shortened. Moreover, the fishing-line introducing portion is formed individually from the bail. In addition, the fishing-line introducing portion is formed into a conical shape, the diameter of which is gradually enlarged from the bail to the line roller. Thus, entwining of the fishing line and the like can be prevented (hereinafter called a "second conventional technique").

Further, another end of the bail is directly joined to the other one of the a pair of bail support members. A joint portion between the other bail support member and the other end of the bail extends in a direction perpendicular to a rotation and inversion axis of the a pair of bail support members as disclosed in, for example, Japanese Utility Model Unexamined Publication No. Hei.5-43865 (hereinafter called a "third conventional technique).

The first conventional technique arranged such that the bail and the fishing-line introducing portion are formed integrally, however, encounters a necessity of forming a too complicated shape. Therefore, there arises a problem in that the manufacturing process cannot be simplified and the manufacturing cost cannot be reduced.

The second conventional technique encounters formation of the stepped portion of the bail attaching portion between the bail and the fishing-line introducing portion. As a result, the fishing line is undesirably caught. Thus, there arises a problem in that entwining of the fishing line easily occurs and damage is frequently caused from the fishing line. What is worse, the bail must be bent when the bail is joined to the fishing-line introducing portion. Therefore, the bail cannot easily be formed. If the bail has the complicated shape, there arises a problem in that deformation of the bail support member caused from the stress exerted from the bail inhibits a smooth inversion operation of the bail.

Further, in the third conventional technique which discloses the joint portion between the other bail support member and the other end of the bail, the distance between a region of the spool with which the fishing line is brought into contact and a region of the bail with which the fishing line is brought into contact is gradually elongated in the direction in which the bail extends. Therefore, when the bail is inverted when the fishing line is wound, guiding of the fishing line picked by the bail positioned at the other position to the fishing-line guide portion of one of the bail support members is sometimes inhibited. If reeling of the fishing line is continued without any recognition of the foregoing state, there is apprehension that, for example, groove-shape damage of the bail occurs and the fishing line is broken. What is worse, deterioration in a state where the fishing line is wound sometimes causes backlash to occur when the fishing line is unreeled.

SUMMARY OF THE INVENTION

In view of the foregoing, an object of the present invention is to provide a low-cost spinning reel for fishing which is capable of smoothly guiding a fishing line along a bail to prevent occurrence of entwining of the fishing line and damage caused from the fishing line and permitting the bail to perform a smooth inversion operation.

To achieve the foregoing object, according to a first aspect of the invention, there is provided a spinning reel for fishing comprising: a bail support member rotatively joined to an arm of a rotor rotatively supported by a reel body; and a bail supported by the bail support member, wherein bail support member incorporates a fishing-line guide portion and a fishing-line introducing portion disposed adjacent to the fishing-line guide portion, a bail attaching portion to which the bail can be joined is formed at the leading end of the fishing-line introducing portion, the bail attaching portion of the fishing-line introducing portion is formed in a direction in which the bail extends such that the bail attaching portion is inclined from the axial direction of the fishing-line guide portion, and the bail attaching portion and the bail are disposed on a straight line on substantially the same axis.

Further, according to a second aspect of the invention, there is provided a spinning reel for fishing comprising: a bail support member rotatively joined to an arm of a rotor rotatively supported by a reel body; and a bail supported by the bail support member, wherein the bail support member incorporates a fishing-line guide portion and a fishing-line introducing portion disposed adjacent to the fishing-line guide portion, a bail attaching portion to which the bail can be joined is formed at the leading end of the fishing-line introducing portion, the bail attaching portion of the fishing-line introducing portion is formed in a direction in which the bail extends such that the bail attaching portion is inclined from the axial direction of the fishing-line guide portion, and the bail attaching portion and the bail are disposed on a straight line on substantially the same axis.

Moreover, according to a third aspect of the invention, there is provided a spinning reel for fishing comprising: a bail joined to a pair of arms through a pair of bail support members such that rotation and inversion are permitted, wherein the bail support member supported by either arm is provided with a fishing-line guide portion and a bail attaching portion to which an end of said bail can be joined, another end of said bail is directly joined to said bail support member supported by the other arm, and the other end of said bail is joined to said bail support member such that the other end is inclined toward a spool by a predetermined angle from a joining surface of said bail support member supported by the other arm.

In the third aspect, the angle may be an angle defined between an axis extending from the other end of said bail and said joining surface.

Further, a joining angle of the other end of the bail with respect to said bail support member supported by the other arm may be set such that the other end of said bail is inclined in a direction in which a fishing line is played out.

BRIEF DESCRIPTION OF THE DRAWINGS

FIGS. 3A to 3B are diagrams showing a joining means according to a first modification of the first embodiment, in which FIG. 3A is an exploded view showing a joining portion of the end of the bail and that of the bail attaching portion and FIG. 3B is a diagram showing a state in which the end of the bail and the bail attaching portion have been joined to each other through the joining portion;

FIGS. 4A and 4B are diagrams showing a joining means according to a second modification of the first embodiment, in which FIG. 4A is an exploded view showing a joining portion of the end of the bail and that of the bail attaching portion and FIG. 4B is a diagram showing a state in which the end of the bail and the bail attaching portion have been joined to each other through the joining portion;

FIGS. 5A and 5B are diagrams showing a joining means according to a third modification of the first embodiment, in which FIG. 5A is exploded view showing a joining portion of the end of the bail and that of the bail attaching portion and FIG. 5B is a diagram showing a state in which the end of the bail and the bail attaching portion have been joined to each other through the joining portion;

FIGS. 6A and 6B are diagrams showing a joining means according to a fourth modification of the first embodiment, in which FIG. 6A is exploded view showing a joining portion of the end of the bail and that of the bail attaching portion and FIG. 6B is a diagram showing a state in which the end of the bail and the bail attaching portion have been joined to each other through the joining portion;

FIGS. 7A and 7B are diagrams showing a joining means according to a fifth modification of the first embodiment, in which FIG. 7A is an exploded view showing a joining portion of the end of the bail and that of the bail attaching portion and FIG. 7B is a diagram showing a state in which the end of the bail and the bail attaching portion have been joined to each other through the joining portion;

DETAILED DESCRIPTION OF THE PREFERRED EMBODIMENTS

An embodiment of a spinning reel for fishing according to the present invention will now be described with reference to the drawings.

First Embodiment

Figure 1:
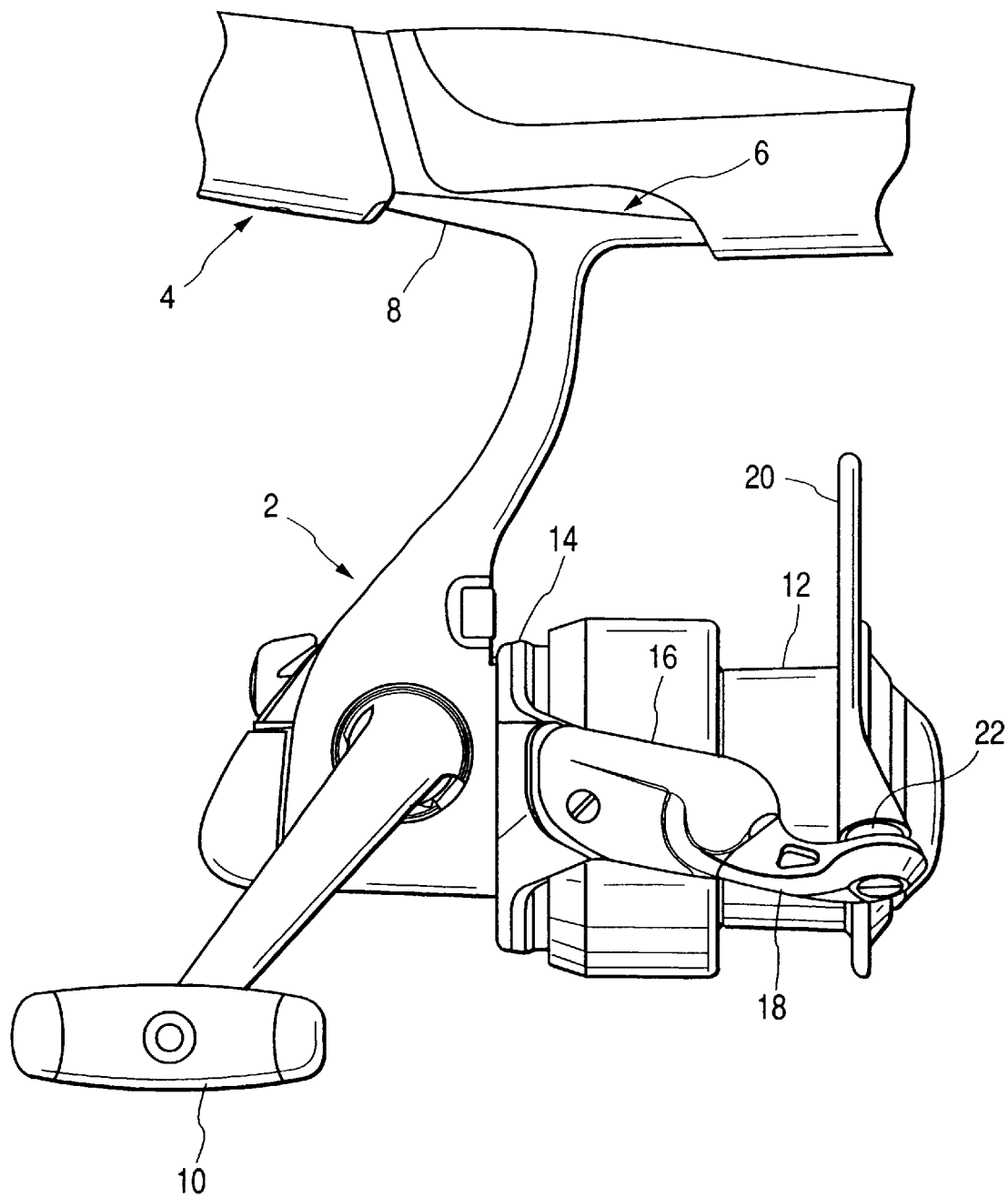
FIG. 1 is a side view showing a spinning reel for fishing according to a first embodiment of the present invention.

As shown in FIG. 1, the spinning reel for fishing incorporate a reel body 2 and reel legs 8 for joining the reel body 2 to a reel joining portion 6 of a fishing rod 4. The reel body 2 includes a drive gear (not shown) which is rotated owing to rotations of a handle 10. A hollow pinion (not shown) is engaged to the drive gear.

A spool shaft (not shown) penetrates the pinion in the axial direction of the pinion. A spool 12 around which the fishing line (not shown) is wound is joined to the leading end of the spool shaft.

A rotor 14 capable of rotating integrally with the pinion is joined to the pinion. The rotor 14 is provided with a pair of bail joining arms 16. The bail 20 is, through swing arms 18, supported by the bail joining arms 16 such that the bail 20 is able to rotate and invert between a position at which the fishing line is unreeled and a position at which the fishing line is reeled. Note that a fishing-line guide portion (a line roller) 22 is supported between the swing arm 18 and an end of the bail 20.

An oscillating mechanism (not shown) is engaged to the foregoing drive gear. When the drive gear is rotated by rotating the handle 10, the spool shaft can be moved in the lengthwise direction.

The spinning reel for fishing according to this embodiment has the foregoing structure. In a state in which the bail 20 has been rotated to the position at which the fishing line is unreeled, casting is performed. Then, the handle 10 is rotated. In the foregoing case, the bail 20 is inverted to the position at which the fishing line is reeled. Moreover, rotations of the handle 10 are transmitted to the pinion through the drive gear. Thus, the pinion is rotated. Simultaneously, the rotations of the handle 10 are transmitted to the spool shaft through the oscillating mechanism to move the spool shaft in the lengthwise direction. At this time, the spool 12 is moved in the lengthwise direction while the rotor 14 is being rotated. Therefore, the fishing line is uniformly and in parallel wound the spool 12 through the fishing-line guide portion (the line roller) 22.

To smoothly introduce the fishing line so as to prevent entwining of the fishing line and damage caused from the fishing line and permit smooth inverting operation of the bail during the operation for winding the fishing line, the spinning reel for fishing according to this embodiment is structured as follows.

Figure 2A:
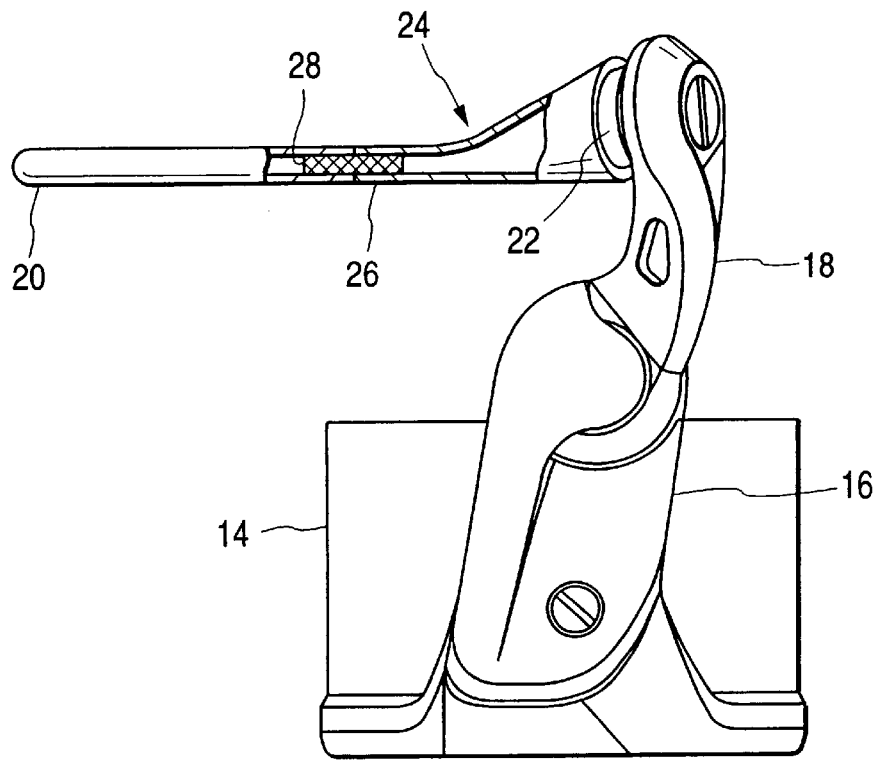
FIG. 2A is a diagram showing the structures of a bail and a bail support member according to a first embodiment of the invention.
Figure 2B:
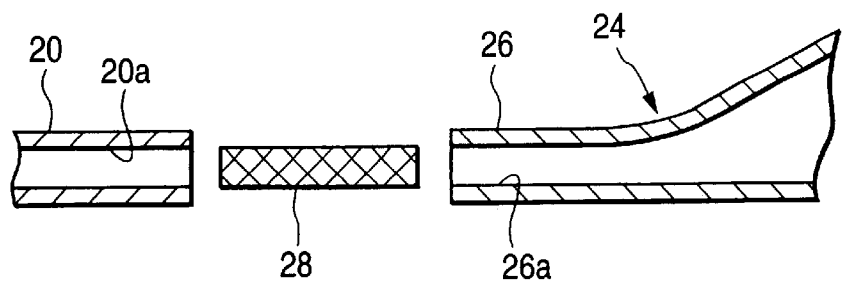
FIG. 2B is an exploded view showing an end of the bail and a bail attaching portion of FIG. 2A.
Figure 2C:
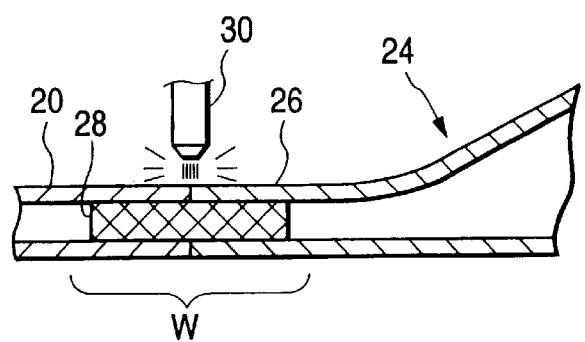
FIG. 2C is a diagram showing a state in which the end of the bail and the bail attaching portion are joined to each other through a joining portion of FIG. 2A.

As shown in FIGS. 2A to 2C, this embodiment is structured such that the bail 20 is joined to a pair of bail joining arms 16 through a bail support member such that rotation and inversion of the bail 20 are permitted. The bail support member incorporates the swing arm 18; the fishing-line guide portion (the line roller) 22 rotatively joined to the swing arm 18; and a fishing-line introducing portion 24 disposed adjacent to the fishing-line guide portion 22. A bail attaching portion 26 to which an end of the bail 20 can be joined is formed at the leading end of the fishing-line introducing portion 24.

In the foregoing structure, the fishing-line introducing portion 24 has a shape (a curved surface), the diameter of which is gradually reduced from the line roller (fishing-line guide portion) 22 toward the bail attaching portion 26. The end of the bail 20 and the bail attaching portion 26 are formed into substantially the same surface shape having the same diameter without any projection and recess. Moreover, the end of the bail 20 and the bail attaching portion 26 are joined to each other on substantially the same axis by a predetermined joining means. Namely, the fishing-line introducing portion 24 has a shape (a curved surface), the diameter of which is gradually reduced from the line roller (fishing-line guide portion) 22 to the bail attaching portion 26. Further, the bail attaching portion 26 of the fishing-line introducing portion 24 projects in a direction in which the end of the bail 20 extends. The bail attaching portion 26 and the end of the bail 20 are formed into substantially the same surface shape having the same diameter without any projection and recess. Moreover, the bail attaching portion 26 and the end are joined to substantially the same axis by a predetermined joining means. The foregoing structure permits the bail 20 to be joined to the bail attaching portion 26 of the fishing-line introducing portion 24 such that the bail 20 is not bent when the bail attaching portion 26 and the end of the bail 20 are joined to each other.

The "curved surface" includes the conical curved surface and the recess curved surface.

A joining portion W in at least one side of the end of the bail 20 and that of the bail attaching portion 26 has hollow portions 20a and 26a each having a predetermined shape. A pin 28 serving as a joining means is inserted into the hollow portions 20a and 26a. Thus, the end of the bail 20 and the bail attaching portion 26 can be joined to each other.

In a state where the pin 28 has been inserted into the hollow portions 20a and 26a to join the end of the bail 20 and the bail attaching portion 26 to each other, a welding unit 30 serving as a joining means is operated to weld (for example, braze or argon weld) the joining portion W of the end of the bail 20 and that of the bail attaching portion 26.

It is preferable that the pin 28 is made of the same material (for example, copper, brass, steel, aluminum or SUS) as that of the bail 20 and the bail attaching portion 26 (the fishing-line introducing portion 24).

As described above, the structure is arranged such that the bail 20 and the fishing-line introducing portion 24 are individually formed. Thus, the fishing-line introducing portion 24 can easily be machined into a predetermined surface shape (a curved surface with which the fishing line picked by the bail 20 when the fishing line is wound can smoothly be guided to the line roller 22). As a result, the manufacturing process can be simplified, causing the manufacturing cost to be reduced.

The end of the bail 20 and the bail attaching portion 26 are formed into substantially the same surface shape having the same diameter without any projection and recess. Moreover, the end of the bail 20 and the bail attaching portion 26 are joined to substantially the same axis by the predetermined joining means. Therefore, the joining portion W free from a stepped portion can be realized. As a result, problems experienced with the conventional technique in that the fishing line is caught and, therefore, entwining of the fishing line and damage caused from the fishing line can be overcome.

Moreover, the bail attaching portion 26 of the fishing-line introducing portion 24 is allowed to project in the direction in which the end of the bail 20 extends. Therefore, a necessity the conventional technique that the bail 20 is bent when the bail 20 is joined to the fishing-line introducing portion 24 can be eliminated. As a result, the shape of the bail 20 can easily be formed, causing the shape of the bail to be simplified.

Note that the present invention is not limited to the foregoing embodiment. A variety of the following modifications are permitted.

Figure 3A:
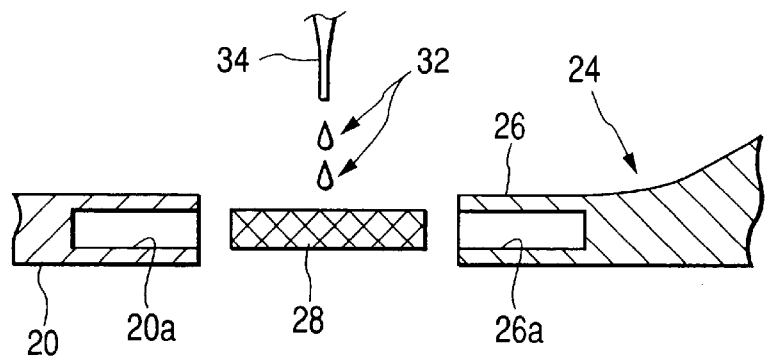
Figure 3B:
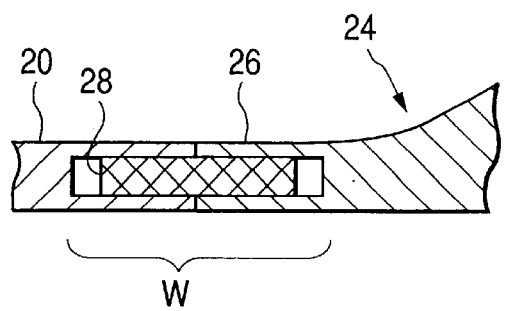

As a first modification of the first embodiment, an adhesive agent 32 may be employed to serve as the joining means, for example, as shown in FIGS. 3A and 3B. In the foregoing case, the surface of the pin 28 is coated with the adhesive agent 32 (see FIG. 3A) from the bonded unit 34. Then, the pin 28 coated with the adhesive agent 32 is inserted into the hollow portions 20a and 26a of the end of the bail 20 and the bail attaching portion 26 (see FIG. 3B). As a result, the end of the bail 20 and the bail attaching portion 26 are joined (bonded) to each other through the pin 28 coated with the adhesive agent 32.

Figure 4A:
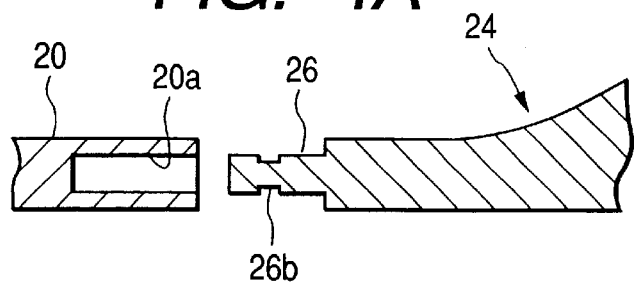
Figure 4B:
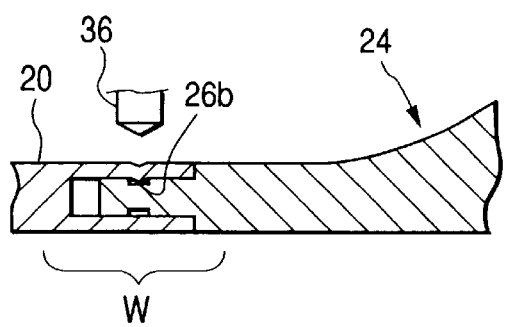

As a second modification, a caulking method serving as the joining means may be employed, for example, as shown in FIGS. 4A and 4B. In the foregoing case, the bail attaching portion 26 of the fishing-line introducing portion 24 is designed to have an outer diameter slightly smaller than the inner diameter of the hollow portion 20a at the end of the bail 20. The bail attaching portion 26 is integrally formed at the leading end of the fishing-line introducing portion 24 to project over the leading end (see FIG. 4A). The bail attaching portion 26 is into the hollow portion 20a at the end of the bail 20. Then, the caulking unit 36 serving as the joining means is operated to caulk the joining portion W (see FIG. 4B). Specifically, a recess groove 26b is formed in the outer surface of the bail attaching portion 26. The bail attaching portion 26 having the recess groove 26b is inserted into the hollow portion 20a at the end of the bail 20. Then, the caulking unit 36 is operated to caulk and deform the end of the bail 20 into the recess groove 26b. As a result, the end of the bail 20 is partially introduced into the recess groove 26b. Thus, the end of the bail 20 and the bail attaching portion 26 are joined (caulked) to each other.

An inverse pattern of the second modification may be employed in which the end of the bail 20 is formed into a projection having an outer diameter which is slightly smaller than the inner diameter of the hollow portion 26a (see FIG. 3A) of the bail attaching portion 26. The end of the bail 20 is introduced into the hollow portion 26a of the bail attaching portion 26. Then, the caulking unit 36 serving as the joining means is operated to caulk the joining portion. In the foregoing case, a similar effect obtainable from the second modification can be obtained.

Figure 5A:
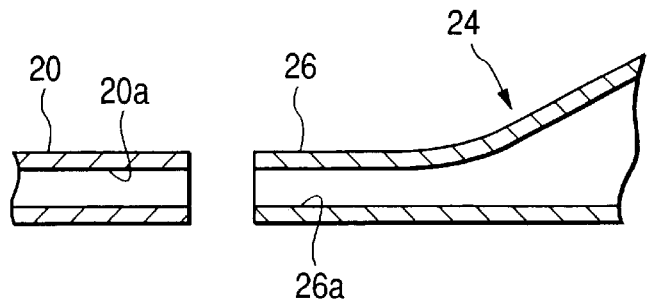
Figure 5B:
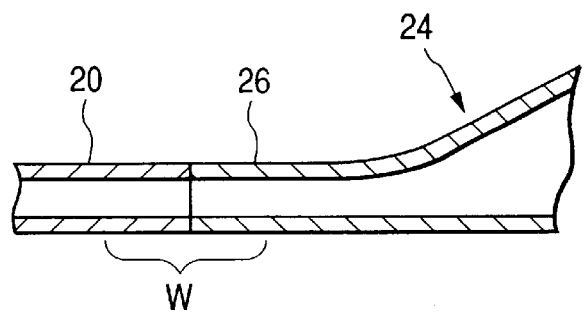

As a third modification, the pin 28 is not employed, for example, as shown in FIGS. 5A and 5B. A predetermined joining means may be operated to join the end of the bail 20 and the bail attaching portion 26 to each other. The third modification uses a method of joining the end of the bail 20 and the bail attaching portion 26 having the corresponding hollow portions 20a and 26a. The joining method in this modification may be any one of a variety of methods including bonding, brazing and welding.

Figure 6A:
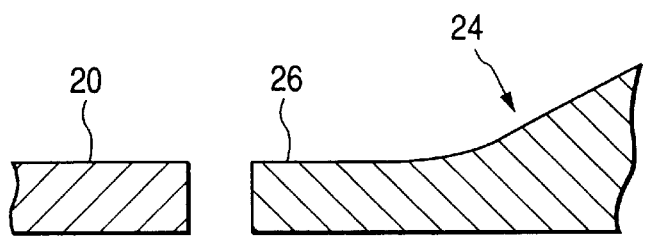
Figure 6B:
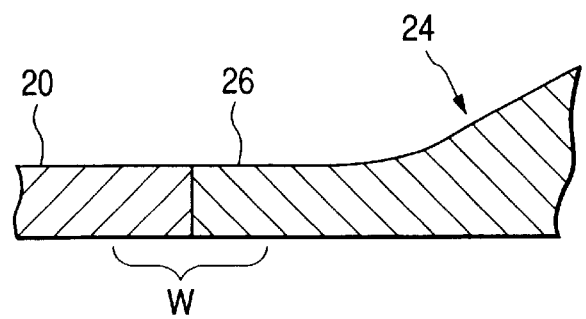

A fourth modification, for example, as shown in FIGS. 6A and 6B may be employed in which the pin 28 is not employed. A predetermined joining means is used to join the end of the bail 20 and the bail attaching portion 26 to each other. The fourth modification uses a method of joining the solid end of the bail 20 and the solid bail attaching portion 26 from which the hollow portions 20a and 26a are omitted. The joining method in this modification may be any one of a variety of methods including bonding, brazing and welding.

Figure 7A:
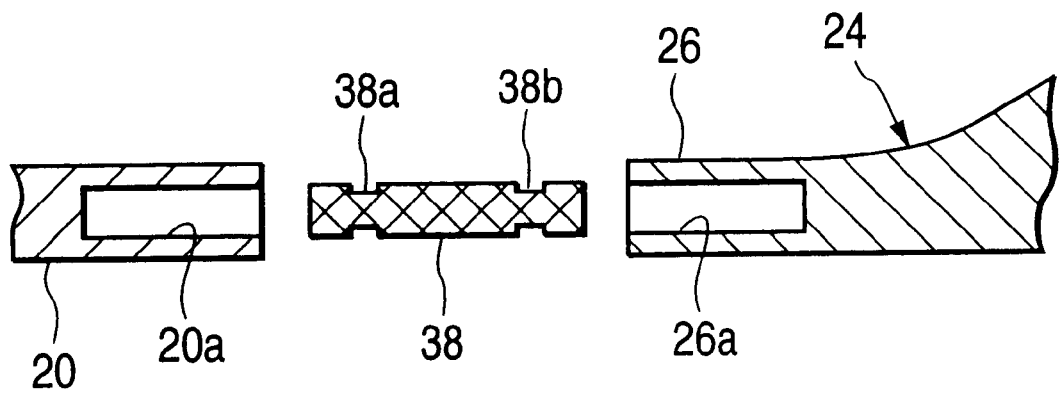
Figure 7B:
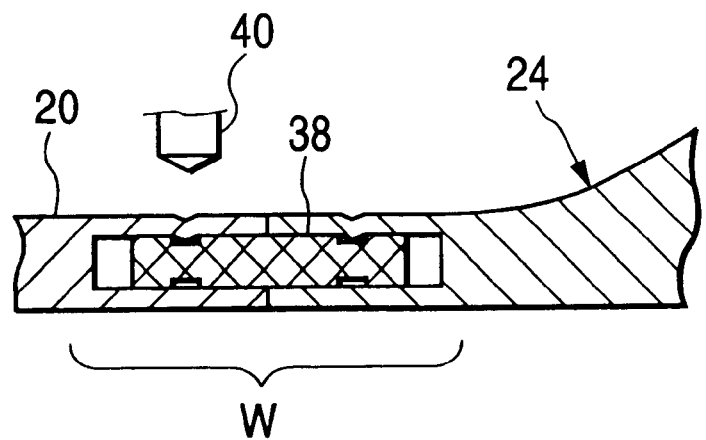

A fifth modification structured, for example, as shown in FIGS. 7A and 7B may be employed. In this modification, a caulking method using a present invention 38 serving as the joining means is employed. In the foregoing case, the pin 38 is inserted into the hollow portions 20a and 26a of the end of the bail 20 and the bail attaching portion 26. Then, the caulked unit 40 serving as the joining means is operated to caulk the joining portion W. Specifically, recess grooves 38a and 38b are formed on the two sides of the pin 38 (see FIG. 7A). The pin 38 having the recess grooves 38a and 38b is introduced into the hollow portions 20a and 26a of the end of the bail 20 and the bail attaching portion 26. Then, the caulked unit 40 is operated to caulk and deform the end of the bail 20 toward the inside portion of the recess groove 38a and further caulk and deform the bail attaching portion 26 into the inside portion of the recess groove 38b. As a result, a portion of the end of the bail 20 is introduced into the recess groove 38a. Moreover, the bail attaching portion 26 is partially introduced into the recess groove 38b. Thus, the end of the bail 20 and the bail attaching portion 26 are joined (caulked) to each other (see FIG. 7B).

Second Embodiment

A spinning reel for fishing according to a second embodiment will now be described with reference to FIGS. 8 to 12C. This embodiment relates to the joining portion between the end of the bail and the bail attaching portion, and the remaining portions are the same as those of the first embodiment. Accordingly, the portions identical to those having been described in the first embodiment are referred to by the common symbols.

In the structure according to the second embodiment, a bail attaching portion 126 of the fishing-line introducing portion 24 is formed along a direction (a direction in which the end of the bail 20 extends) T inclined from an axial direction S of the fishing-line guide portion (the line roller) 22. Moreover, the bail attaching portion 126 and the end of the bail 20 are linearly disposed on substantially the same axis. Note that the axial direction S is inclined inwards (in a direction to approach the reel body 2 and the spool 12) with respect to an axial direction P which is perpendicular to the rotation and inversion axis (a rotational shaft of the swing arm 18) R of the bail support member (see FIG. 8).

Moreover, the fishing-line introducing portion 24 has a shape (a curved surface), the diameter of which is gradually reduced from the fishing-line guide portion (the line roller) 22 toward the bail attaching portion 126. Specifically, the fishing-line introducing portion 24 is formed into a curved surface with which the fishing line picked by the bail 20 when the fishing line is wound can smoothly be guided to the fishing-line guide portion (the line roller) 22. Note that the curved surface includes a conical shape and a concave shape.

The bail attaching portion 126 projects over the leading end of the fishing-line introducing portion 24. An end of the bail 20 is joined to cover the bail attaching portion 126. In the foregoing case, a stepped portion formed in the bail attaching portion 126 between the end of the bail 20 and the fishing-line introducing portion 24 has a shape having the diameter which is reduced in a direction in which the fishing line picked by the bail 20 is guided to the fishing-line guide portion (the line roller) 22 when the fishing-line is wound. Therefore, the fishing line is not caught by the bail attaching portion 126. Thus, the fishing line can smoothly be guided to the fishing-line guide portion (the line roller) 22.

The foregoing structure is arranged such that the bail 20 and the fishing-line introducing portion 24 are formed individually. Therefore, the fishing-line introducing portion 24 can be machined into a required shape (the curved surface with which the fishing line picked by the bail 20 can smoothly be guided to the fishing-line guide portion (the line roller) 22 when the fishing line is wound). As a result, the manufacturing process can be simplified, causing the manufacturing cost to be reduced.

Since the structure is arranged such that the bail 20 is joined to cover the bail attaching portion 126, the stepped portion of the bail attaching portion 126 between the end of the bail 20 and the fishing-line introducing portion 24 can be formed into the shape having the diameter which is reduced in the direction in which the fishing line picked by the bail 20 is guided to the fishing-line guide portion (the line roller) 22. As a result, the problem experienced with the conventional technique and suffered from frequent occurrence of entwining of the fishing line and damage caused from the fishing line can be overcome.

Moreover, the bail attaching portion 126 of the fishing-line introducing portion 24 is formed in the direction (the direction in which the end of the bail 20 extends) which is inclined with respect to the axial direction S of the fishing-line guide portion (the line roller) 22. Moreover, the bail attaching portion 126 and the end of the bail 20 are formed on the straight line on substantially the same axis. Therefore, the necessity for the conventional technique that the bail 20 is bent when the bail 20 is joined to the fishing-line introducing portion 24 can be eliminated. As a result, the shape of the bail 20 can easily be formed, causing the shape of the bail 20 be simplified. In addition, any excessive stress is not exerted on the bail 20. Thus, also exertion of excessive force on the support portion for supporting the bail 20 can be prevented. As a result, the inverting operation of the bail 20 can smoothly be performed.

Figure 8:
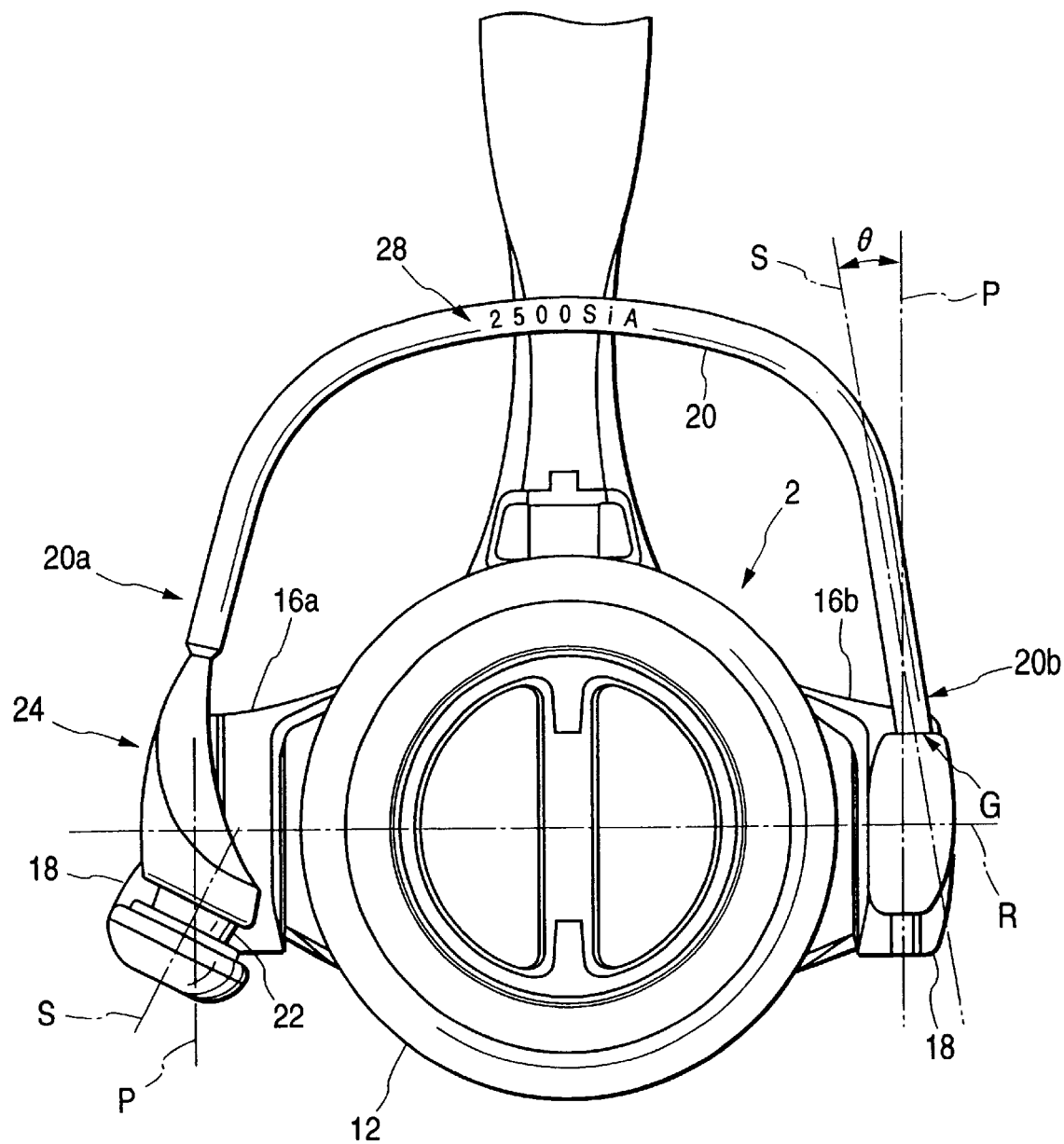
FIG. 8 is a front view showing the spinning reel for fishing according to a second embodiment of the invention.

Since the structure is arranged such that the bail 20 is joined to cover the bail attaching portion 126, the diameter of the bail 20 can be enlarged as compared with the diameter permitted for the conventional technique. As a result, for example, decorations 28 (specifically, indication of the size of the reel and the like), such as required characters and patterns, can easily be provided for the surface of the bail 20, as shown in FIG. 8. In the foregoing case, the decorations are provided for the bail 20 by, for example, any one of a variety of methods including laser machining, printing and engraving.

Figure 9A:
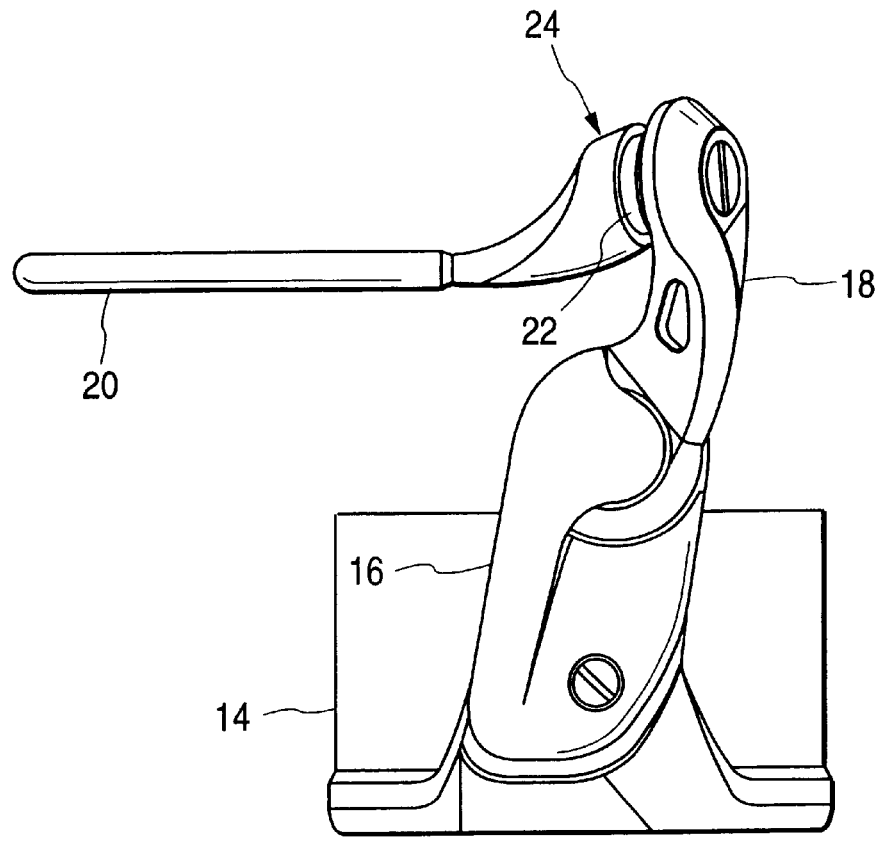
FIG. 9A is a diagram showing the structures of a bail and a bail support member according to the second embodiment.
Figure 9B:
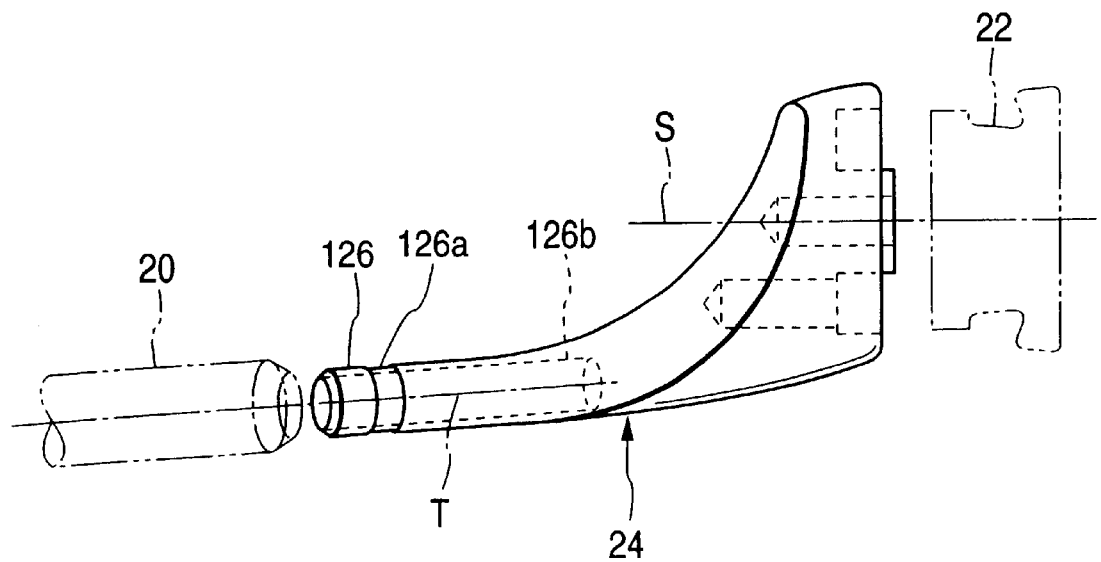
FIG. 9B is an exploded perspective view showing the structures of the bail and the bail support member of FIG. 9A.
Figure 10A:
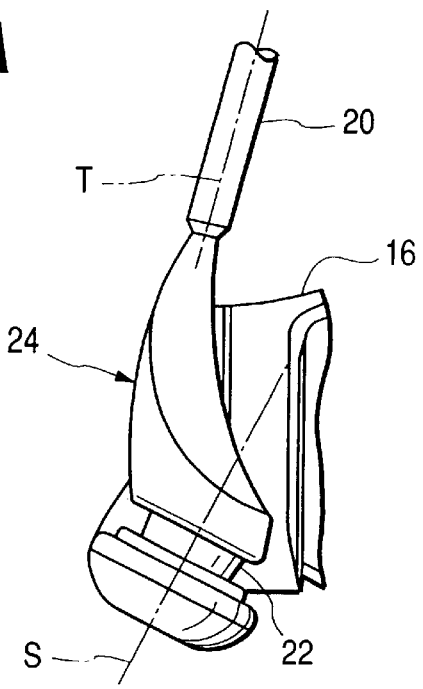
FIG. 10A is a diagram showing the structures of the bail and the bail support member when they are viewed from a direction different from the direction in FIG. 9A.
Figure 10B:
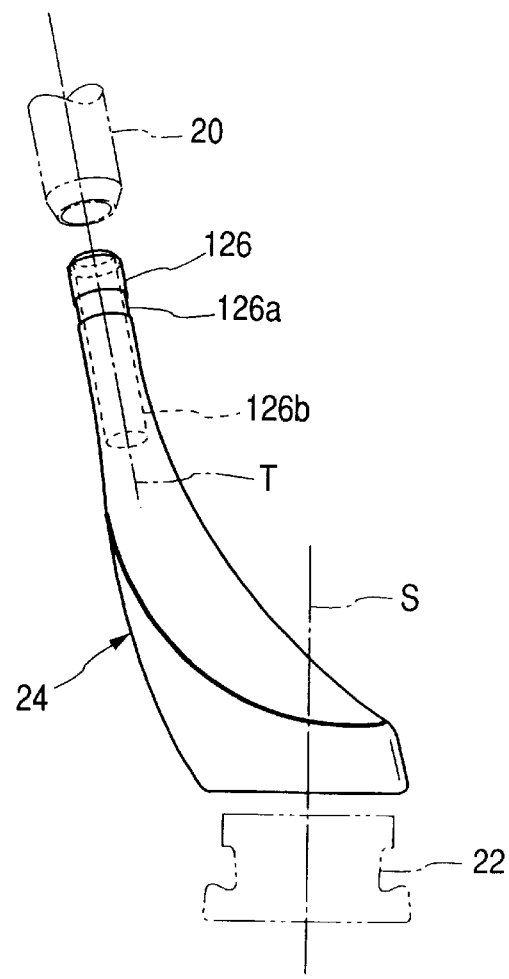
FIG. 10B is an exploded perspective view showing the structures of the bail and the bail support member when they are viewed from a direction different from the direction in of FIG. 9B.

In a structure shown in FIGS. 9B and 10B, the stepped portion 126a for easily joining the bail attaching portion 126 and the end of the bail 20 to each other is formed adjacent to the bail attaching portion 126. The stepped portion 126a may be omitted. The bail attaching portion 126 may be formed into a flushed surface. In the bail attaching portion 126 shown in FIGS. 9B and 10B, there is a hollow portion 126b into which a reinforcing member (not shown) which is used when the end of the bail 20 is joined to the bail attaching portion 126 can be inserted is formed. The hollow portion 126b can be omitted. The bail attaching portion 126 may be formed into a solid structure.

In addition, the bail support member supported by the other bail joining arm 16b incorporates a swing arm 18. Another end 20b of the bail 20 is directly joined to the swing arm 18.

As shown in FIGS. 11A to 12C, the other end 20b of the bail 20 is joined to the bail support member (the swing arm 18) such that the end 20b is inclined toward the spool 12 by a predetermined angle θ with respect to a joining surface P of the bail support member (the swing arm 18) supported by the other bail joining arm 16b.

In the foregoing case, the mounting surface P is a surface perpendicular to a rotation and inversion axis R of the pair of bail joining arms 16a and 16b. The angle θ is an angle made between an extending axis S of the other end 20b of the bail 20 and the mounting surface P. It is preferable that the angle θ satisfies a range that $0°<θ≦30°$.

As described above, the other end 20b of the bail 20 is inclined to the spool 12 by the predetermined angle θ. Thus, the distance from a region of the spool 12 with which the fishing line is brought into contact to a region of the other end 20b of the bail 20 with which the fishing line is brought into contact is gradually shortened. The reduction takes place from a joint portion G between the other bail support member (the swing arm 18) and the other end 20b of the bail 20 toward a direction in which the other end 20b of the bail 20 extends. As a result, when the bail 20 is inverted during the winding the fishing line, the fishing line picked by the other end 20b of the bail 20 can smoothly be guided to the fishing-line guide portion (the line roller) 22 of the bail support member supported by the bail joining arm 16a. Therefore, groove-shape damage of the bail 20, breakage of the fishing line and occurrence of backlash due to deterioration in the state where the fishing line is wound when the fishing line is unreeled can be prevented.

Figure 11A:
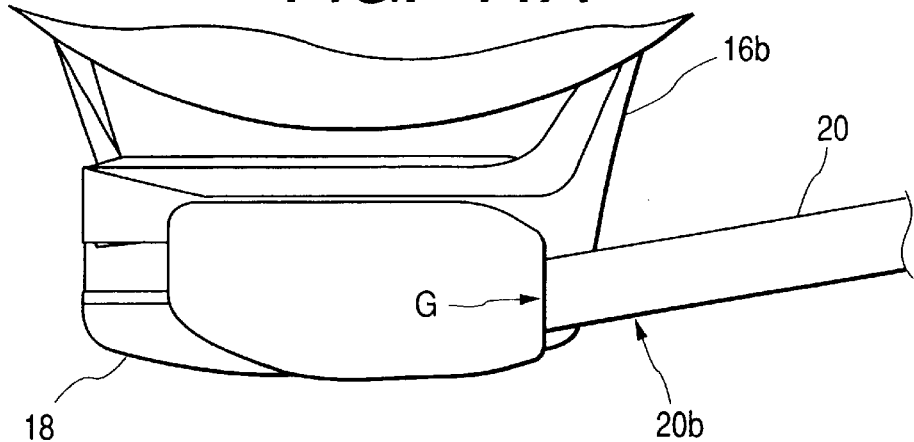
FIGS. 11A to 11C are diagrams showing a state in which another end of a bail is inclined to a spool according to the second embodiment.
Figure 11B:
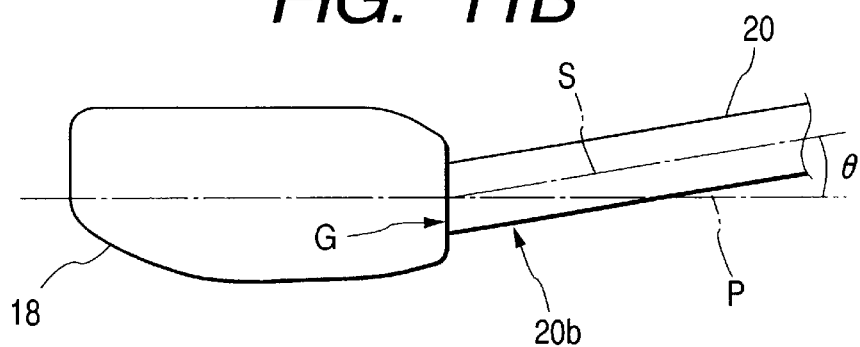
Figure 11C:
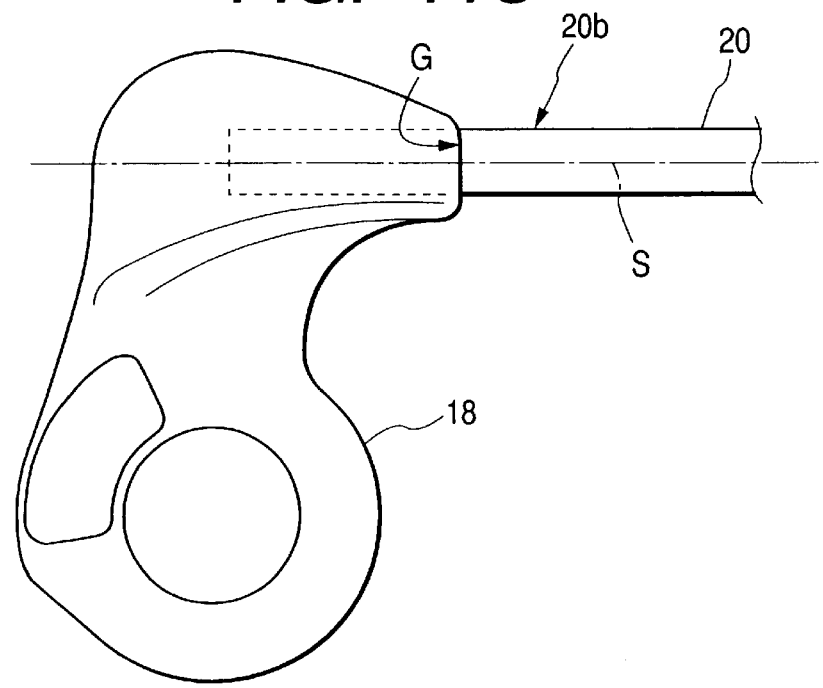
Figure 12A:
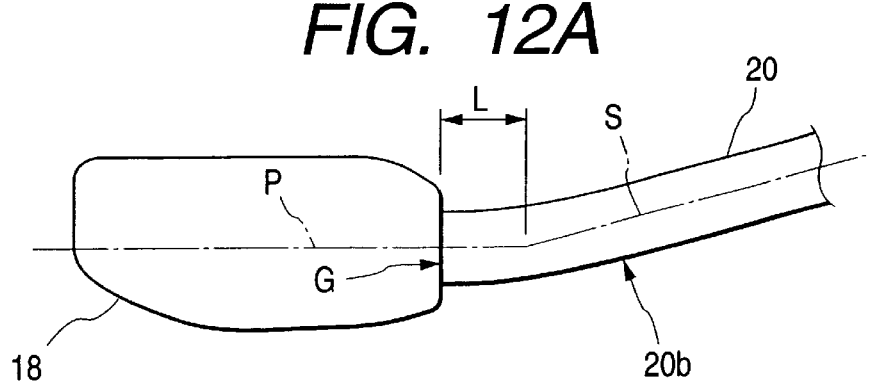
FIG. 12A is a diagram showing another example of the state where the other end of the bail is inclined according to a first modification of the second embodiment.

In addition to the structure shown in FIGS. 11A to 11C, a structure as shown in, for example, FIG. 12A, may be employed in which the other end 20b of the bail 20 is extended from the joining portion G along the joining surface P by a predetermined length L (for example, 0 mm<L≦50 mm, preferably 0 mm<L≦25 mm), and then, the other end 20b is inclined in the direction (toward the spool 12) of the extending axis S. In the foregoing case, similar effects and operations are permitted.

Figure 12B:
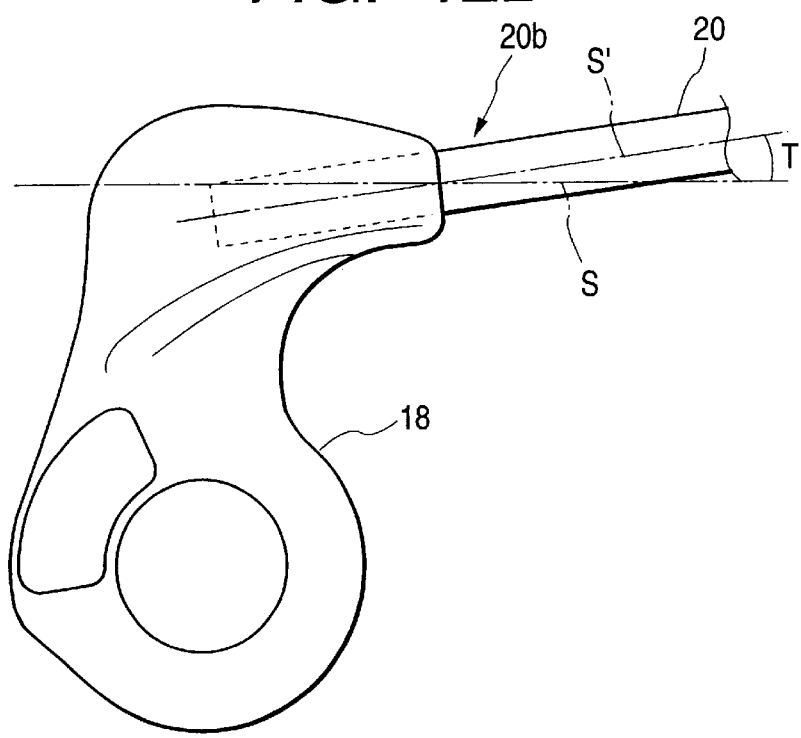
FIG. 12B is a diagram showing a state where the joining angle of the other end of the bail is inclined in the direction in which the fishing line is unreeled.

In addition to the foregoing structure, a structure as shown in, for example, FIG. 12B is employed in which a joining angle T of the other end 20b of the bail 20 with respect to the bail support member (the swing arm 18) supported by the other bail joining arm 16b is set such that the other end 20b is inclined in the direction in which the fishing line is played out. It is preferable that the joining angle T satisfies $0°<T≦30°$.

The joining angle T may be an angle shown in FIG. 3 and can be set with reference to the extending axis S of the other end 20b of the bail 20 joined to the bail support member (the swing arm 18). Thus, an extending axis S' is defined which is an extending axis of the other end 20b realized when the other end 20b of the bail 20 is inclined by a joining angle T toward direction in which the fishing line is played out with reference to the extending axis S.

The other end 20b of the bail 20 is inclined to the spool 12 by the predetermined angle θ, and further, the joining angle T of the end 20b of the bail 20 is inclined in the direction in which the fishing line is played out. Thus, the fishing line can furthermore smoothly be guided along the bail 20. The other effects are the same as those obtainable from the foregoing structure. Therefore, the other effects are omitted from description.

Figure 12C:
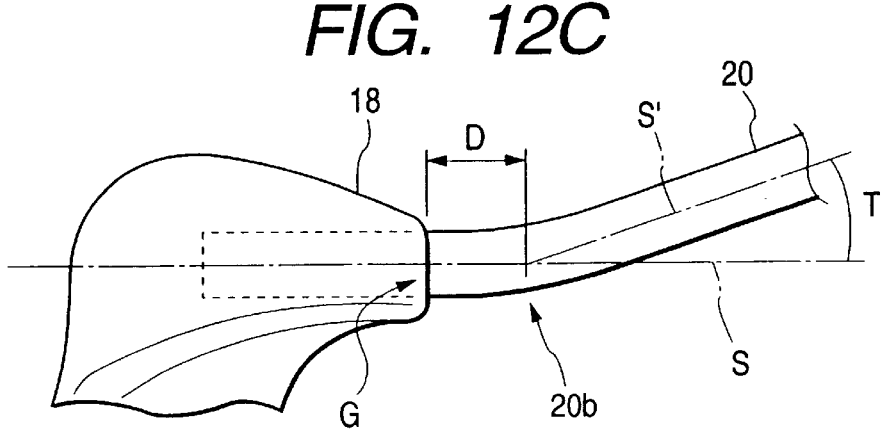
FIG. 12C is a diagram showing another example of the joining angle of the other end of the bail.

In addition to the structure shown in FIG. 12B, the end 20b of the bail 20 is, as shown in, for example, FIG. 12C, extended in the direction of the extending axis S (the direction inclined to the spool 12) for a predetermined distance D (for example, 0 mm<D≦50 mm, preferably 0 mm<D≦25 mm). Then, the other end 20b is inclined in the direction of the extending axis S' (the direction in which the fishing line is played out). In the foregoing case, a similar effect can be obtained.

The foregoing structure permits the diameter of the bail 20 to be enlarged as compared with the conventional bail, as well as the one end side of the bail 20. As a result, for example, decorations 28 (specifically, indication of the size of the reel and the like), such as required characters and patterns, can easily be provided for the surface of the bail 20, as shown in FIG. 8. In the foregoing case, the decorations are provided for the bail 20 by, for example, any one of a variety of methods including laser machining, printing and engraving.

According to the present invention, the low-cost spinning reel for fishing can be provided which is capable of smoothly guiding the fishing line to prevent occurrence of entwining of the fishing line and damage caused from the fishing line and which permits the smooth inverting operation of the bail to be performed.

While only certain embodiments of the invention have been specifically described herein, it will apparent that numerous modifications may be made thereto without departing from the spirit and scope of the invention.

The present disclosure relates to the subject matter contained in Japanese patent applications No. Hei.11-81454 filed on Mar. 25, 1999, No. Hei.11-81455 filed on Mar. 25, 1999 and No. Hei.11-89202 filed on Mar. 30, 1999, each of which is expressly incorporated herein by reference in its entirety.

What is claimed is:

1. A spinning reel for fishing, comprising:

a reel main body;

a rotor rotatably supported by said reel main body;

a pair of bail support members attached to a pair of arm portions of said rotor such that said bail support members are rotatable and invertible relative to said arm portions; and a bail supported by said pair of bail support members, one of said pair of bail support member comprising:

a fishing line guide portion; and a fishing line introducing portion disposed in the vicinity of said fishing line guide portion, said fishing line introducing portion having a bail attaching portion projectingly formed in a leading end thereof, said bail attaching portion being substantially coaxially joined to an end of said bail, wherein said fishing line introducing portion has a surface shape, the diameter of which is gradually reduced from said fishing line guide portion toward said bail attaching portion.

2. A spinning reel for fishing according to claim 1, wherein each of said end of said bail and said bail attaching portion has a hollow portion having a predetermined size, and a pin is inserted into said hollow portions of said end of said bail and said bail attaching portion.

3. A spinning reel for fishing according to claim 2, wherein said pin includes at least one annular groove, and said end of said bail and said bail attaching portion are joined by caulking at least one of said end of said bail and said bail attaching portion in a position radially corresponding to said annular groove of said inserted pin.

4. A spinning reel for fishing according to claim 1, wherein one of said end of said bail and said bail attaching portion has a hollow portion, and the other of said end of said bail and said bail attaching portion is integrally formed with a projection to be inserted into said hollow portion.

5. A spinning reel for fishing according to claim 1, wherein said end of said bail and said bail attaching portion are joined by a predetermined joining means.

6. A spinning reel for fishing according to claim 5, wherein said end of said bail and said bail attaching portion are joined by welding.

7. A spinning reel for fishing according to claim 5, wherein said end of said bail and said bail attaching portion are joined by caulking.

8. A spinning reel for fishing according to claim 5, wherein said end of said bail and said bail attaching portion are joined by bonding.

9. A spinning reel for fishing according to claim 1, wherein said end of said bail and said bail attaching portion are formed in a solid structure.

10. A spinning reel for fishing, comprising:

a reel main body;

a rotor rotatably supported by said reel main body;

a pair of bail support members attached to a pair of arm portions of said rotor such that said bail support members are rotatable and invertible relative to said arm portions; and a bail supported by said pair of bail support members, one of said pair of bail support member comprising:

a fishing line guide portion; and a fishing line introducing portion disposed in the vicinity of said fishing line guide portion, said fishing line introducing portion having a bail attaching portion formed in a leading end thereof, wherein said bail attaching portion is formed along an extending direction of an end of said bail, said extending direction being inclined with respect to the axial direction of said fishing-line guide portion, and said bail attaching portion is joined substantially coaxially and linearly to said end of said bail.

11. A spinning reel for fishing according to claim 10, wherein said fishing line introducing portion has a surface shape, the diameter of which is gradually reduced from said fishing line guide portion toward said bail attaching portion.

12. A spinning reel for fishing according to claim 10, wherein said bail attaching portion is projectingly formed from said fishing line introducing portion, and said bail is attached to cover said bail attaching portion.

13. A spinning reel for fishing, comprising:

a reel main body;

a rotor rotatably supported by said reel main body;

a pair of bail support members attached to a pair of arm portions of said rotor such that said bail support members are rotatable and invertible relative to said arm portions; and a bail supported by said pair of bail support members, one of said pair of bail support member comprising:

a fishing line guide portion; and a fishing line introducing portion disposed in the vicinity of said fishing line guide portion, said fishing line introducing portion having a bail attaching portion projectingly formed in a leading end thereof, said bail attaching portion being substantially coaxially joined to an end of said bail, wherein said fishing line introducing portion has a tapered surface terminating at said bail attaching portion.

14. A spinning reel for fishing according to claim 13, wherein a matching portion of said fishing line introducing portion dimensionally matches the diameter of said end of said bail.

15. A spinning reel for fishing according to claim 13, wherein said end of said bail and said bail attaching portion are formed into substantially the same shape and an outer diameter of said bail attaching portion is smaller than that of said end of said bail.

16. A spinning reel for fishing according to claim 13, wherein said end of said bail has a hollow portion having a predetermined size, and said bail attaching portion is formed as a pin inserted into said hollow portion of said end of said bail.

17. A spinning reel for fishing according to claim 13, wherein each of said end of said bail and said bail attaching portion has a hollow portion having a predetermined size, and a pin is inserted into said hollow portions of said end of said bail and said bail attaching portion.

18. A spinning reel for fishing according to claim 17, wherein said pin includes at least one annular groove, and said end of said bail and said bail attaching portion are joined by caulking at least one of said end of said bail and said bail attaching portion in a position radially corresponding to said annular groove of said inserted pin.

19. A spinning reel for fishing according to claim 13, wherein one of said end of said bail and said bail attaching portion has a hollow portion, and the other of said end of said bail and said bail attaching portion is integrally formed with a projection to be inserted into said hollow portion.

20. A spinning reel for fishing according to claim 13, wherein said end of said bail and said bail attaching portion are joined by a predetermined joining means.

21. A spinning reel for fishing according to claim 20, wherein said end of said bail and said bail attaching portion are joined by welding.

22. A spinning reel for fishing, comprising:

a reel main body;

a rotor rotatably supported by said reel main body;

a pair of bail support members attached to a pair of arm portions of said rotor such that said bail support members are rotatable and invertible relative to said arm portions; and a bail supported by said pair of bail support members, one of said pair of bail support member comprising:
  a fishing line guide portion; and
  a fishing line introducing portion disposed in the vicinity of said fishing line guide portion, said fishing line introducing portion having a bail attaching portion projectingly
  formed in a leading end thereof, said bail attaching portion being joined to an end of said bail, wherein each of said end of said bail and said bail attaching portion has a hollow portion having a predetermined size, and a pin is inserted into said hollow portions of said end of said bail and said bail attaching portion.

23. A spinning reel for fishing according to claim 22, wherein said pin includes at least one annular groove, and said bail attaching portion is joined in a position radially corresponding to said annular groove of said inserted pin.

24. A spinning reel for fishing according to claim 23, wherein said bail attaching portion has an internal detent mating said annular groove.

25. A spinning reel for fishing according to claim 22, wherein said fishing line introducing portion has a surface shape, the diameter of which is gradually reduced from said fishing line guide portion toward said bail.

26. A spinning reel for fishing according to claim 22, wherein said end of said bail has a hollow portion having a predetermined size, and said bail attaching portion is formed as a pin inserted into said hollow portion of said end of said bail.

* * * * *